Feb. 20, 1940.   O. U. ZERK ET AL   2,191,102
REFRIGERANT SYSTEM OPERABLE BY VARIABLE SPEED COMPRESSORS
INCLUDING MEANS FOR CONTROLLING COMPRESSOR CAPACITY
Original Filed July 1, 1935   3 Sheets-Sheet 1
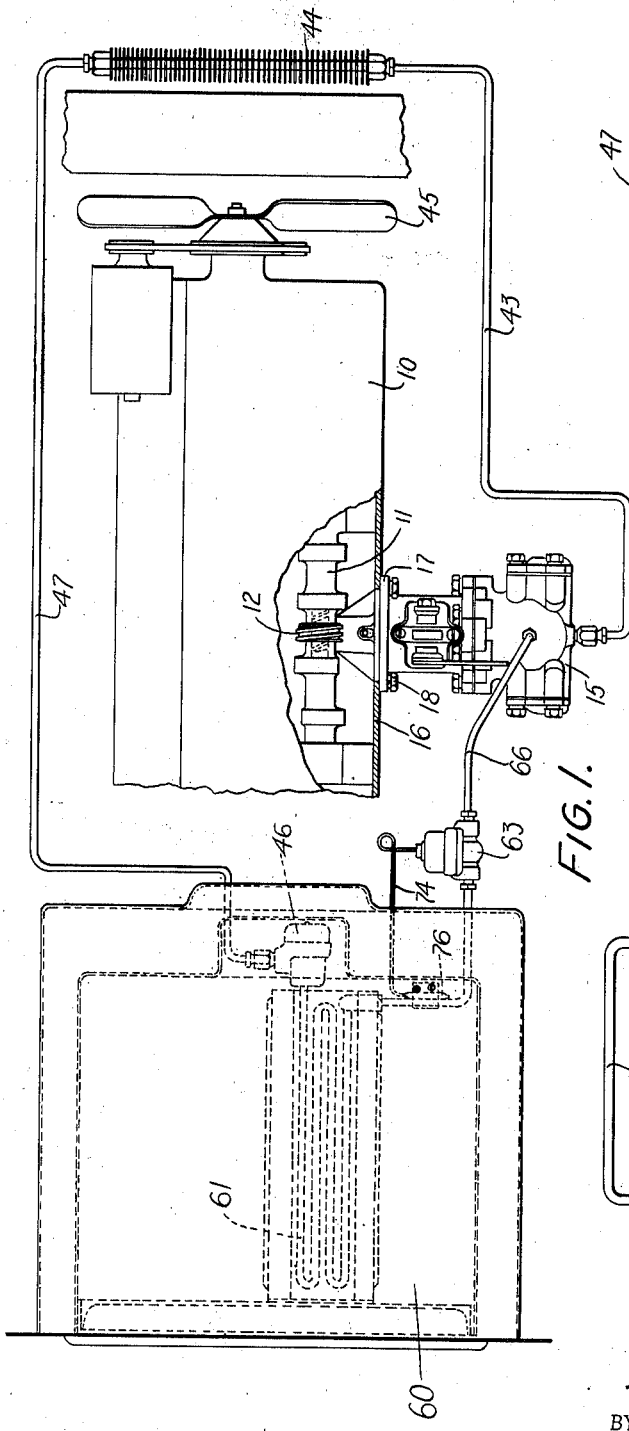
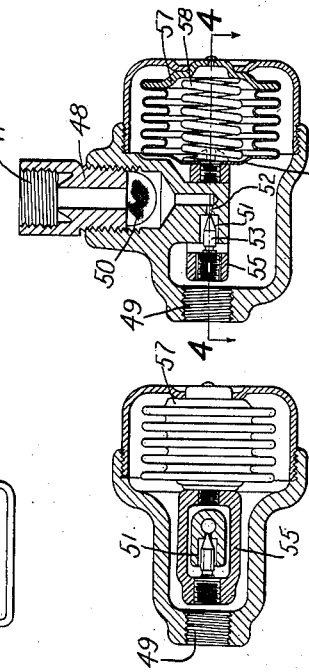
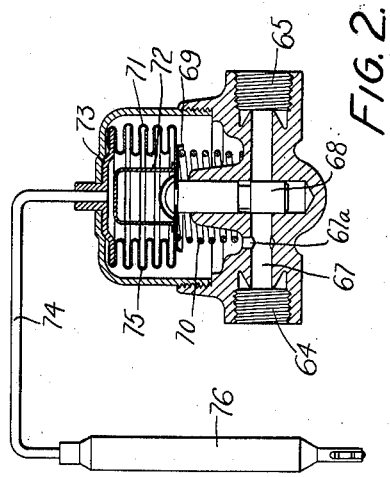
INVENTOR.
Oscar U. Zerk and
BY Daniel R. Vannemann
Stough & Canfield
THEIR ATTORNEYS.

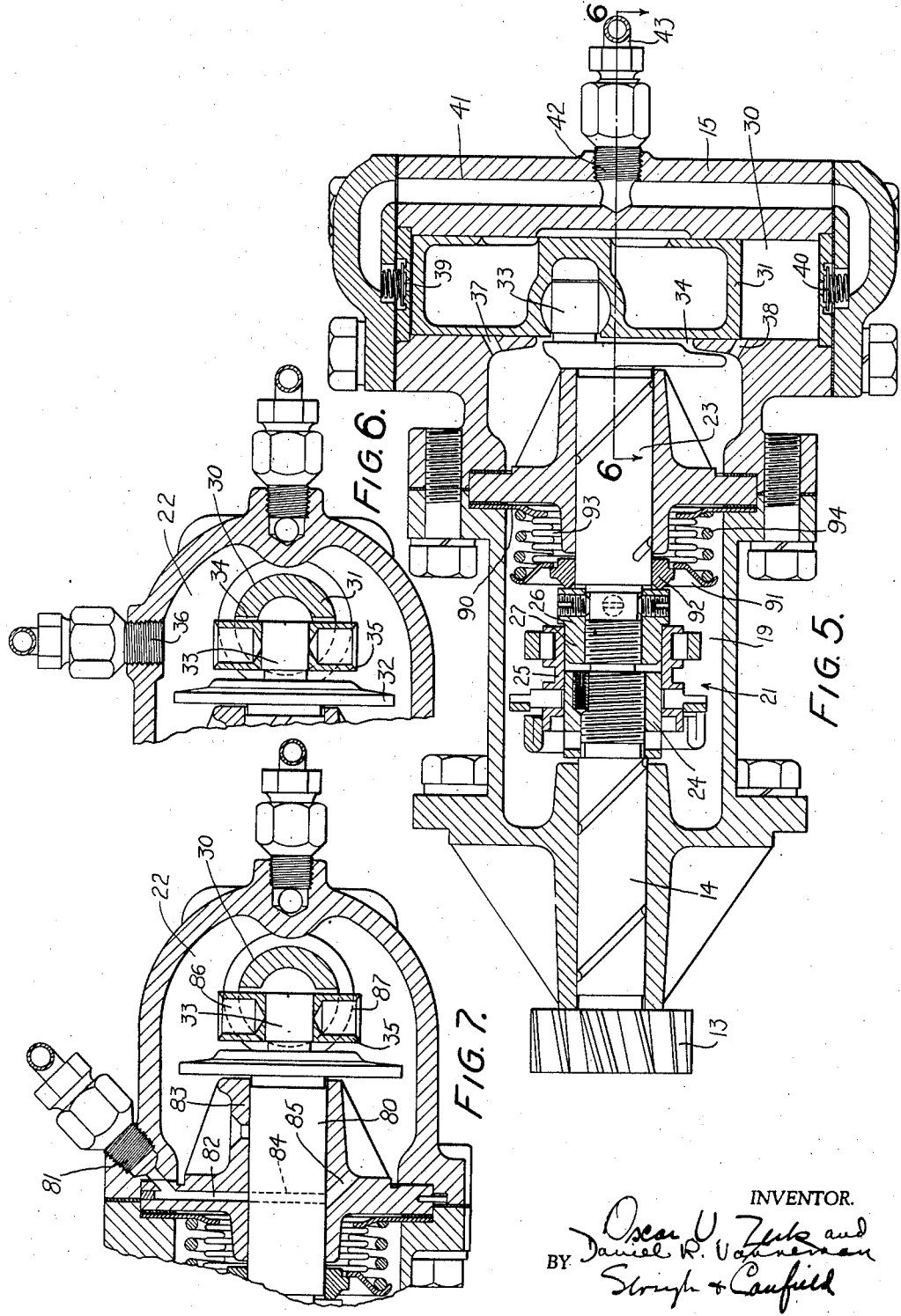

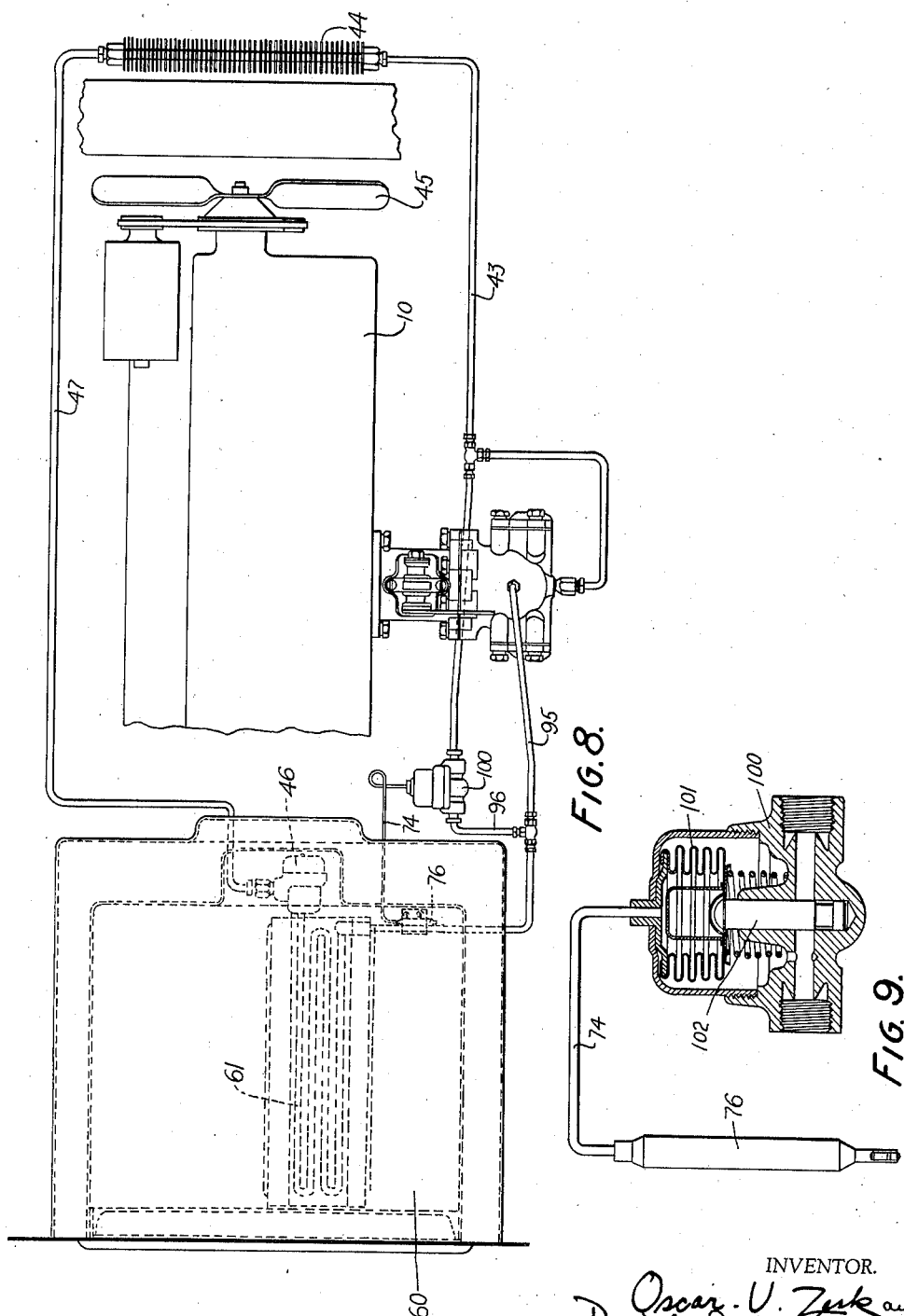

Patented Feb. 20, 1940

2,191,102

UNITED STATES PATENT OFFICE 2,191,102

REFRIGERANT SYSTEM OPERABLE BY VARIABLE SPEED COMPRESSORS INCLUDING MEANS FOR CONTROLLING COMPRESSOR CAPACITY

Oscar U. Zerk and Daniel Roland Vanneman, Chicago, Ill.; said Vanneman assignor to said Zerk Application July 1, 1935, Serial No. 29,333
Renewed March 14, 1938

7 Claims. (Cl. 62—117)

This invention relates to refrigerant systems and apparatus, and more particularly to a refrigerant system operable by a variable speed compressor and adapted for use in automotive vehicles.

We are familiar with prior refrigerating systems of the stationary type and wherein the power source comprises electric motors, steam engines, and internal combustion engines which have a relatively constant speed and can be shut down or started up automatically according to refrigeration demands.

We are also familiar with refrigeration systems intended to operate on automotive trucks and wherein means have been provided between the compressor and the engine, such as a clutch, adapted to slip above a predetermined speed whereby the compressor speed is not automatically increased proportional to engine speed. However, such types of clutches are necessarily elaborate and bulky, as well as expensive to manufacture, and have proven unsatisfactory. The wear and tear on the clutch, due to sudden engagement when the engine speed is excessive and the compressor speed is at a maximum, has also been a detrimental factor in the use of such refrigerating systems.

The compressor operable by a motor receiving power from the automotive generator or battery renders it difficult to provide sufficient electrical power from these sources. In addition to the cost of the motor, the system is relatively expensive due to the large generators and batteries required for successful operation.

Compressors operable directly from the engine or other moving parts of the automobile will necessarily operate at varying speeds and means must be provided preventing excessive refrigerating capacity in the compressor at speeds above a predetermined amount. If no such control is provided, the condenser, evaporator, expansion valve, and interconnecting conduits must be sufficiently large to handle the maximum capacity of the compressor at its maximum speed. These units would necessarily be much larger than actually required and would add considerably to the cost of the system. Additionally, increased capacity of the compressor at high speeds would excessively increase the refrigeration effect resulting in inefficiency and waste.

We have devised a refrigerant system adapted to installation in automotive vehicles operable by a variable speed compressor which may be directly driven by the vehicle engine, which is efficient in operation, can be installed without substantial alteration or addition to the conventional automotive vehicle parts, and which can be conveniently and easily controlled by the vehicle operator.

It is an object of our invention, therefore, to provide a refrigerant system for automotive vehicles employing a variable speed compressor driven directly from the vehicle power source.

Another object of our invention is to provide a refrigerating system of the above type including a refrigerant cabinet adapted to be maintained at a substantially constant refrigerating temperature.

Another object of our invention is to provide a refrigerant system of the above type provided with improved means for controlling the flow of refrigerant medium through the system.

Another object of our invention is to provide a refrigerant system of the above type wherein the flow of refrigerant medium through the system may be controlled responsive to the temperature of the refrigerating cabinet.

Another object of our invention is to provide a refrigerant system of the above type operable by a variable speed compressor, having improved means for controlling the compressor capacity.

Another object of our invention is to provide means in a refrigerating system of the above type to automatically reduce the compressor capacity per revolution proportional to increase of the compressor speed, whereby a substantially uniform refrigeration capacity is maintained above a predetermined speed.

Other objects of our invention and the invention itself will become increasingly apparent from a consideration of the following description and drawings, wherein:

Fig. 1 is a diagrammatic plan view of a refrigerating system embodying our invention, adapted to the conventional automotive vehicle;

Fig. 2 is a horizontal sectional view of a thermostatically controlled valve which we may employ in the system illustrated in Fig. 1;

Fig. 3 is a horizontal medial sectional view of an expansion valve which we employ in the system illustrated in Fig. 1;

Fig. 4 is a vertical sectional view taken along the line 4—4 of Fig. 3;

Fig. 5 is a medial sectional view taken generally along a horizontal plane, illustrating the compressor and operating linkage therefor;

Fig. 6 is a vertical sectional view taken along the line 6—6 of Fig. 5;

Fig. 7 is a fragmentary sectional view generally similar to Fig. 6, illustrating a modification of our invention;

Fig. 8 is a plan diagrammatic view illustrating another modification of our invention, wherein we employ a thermostatically controlled valve adapted to by-pass refrigerant around the compressor; and Fig. 9 is a sectional view of a thermostatic by-pass valve which we employ in the modification of Fig. 8.

Referring now to the drawings, we have indicated generally at 10 an internal combustion engine furnishing motor power for the vehicle, and at 11 the cam shaft effecting operation of the valves, the cam shaft having a worm formed thereon, as indicated at 12, intermediate two of the shaft cam portions.

The worm 12 engages a gear 13 fixedly secured to a shaft 14, the shaft 14 being rotatably mounted in a housing generally indicated at 15. The housing 15 encases the compressor and the link means effecting operation of the compressor in a manner to be later described.

The engine wall, generally indicated at 16, is provided with an opening adjacent the worm 12 and through which the shaft 14 may be projected; the wall portion forming said opening is preferably provided with a peripheral flange 17 and the housing 15 is secured thereto in any suitable manner, as by bolts 18, the flange preferably being formed to incline the housing 15 upwardly. The housing 15 is formed with the chambers indicated at 19 and 20 within which are respectively disposed clutch means generally indicated at 21 and a compressor generally indicated at 22, the housing portion separating the chambers forming a mounting for a shaft 23 adapted to be operatively coupled with the shaft 14 in a manner to be described.

The clutch means 21 and associated parts will be briefly described herein, and are more fully described in our copending application Serial No. 29,336, which may be referred to for more detailed information.

The shaft 14 has an element 24 threadedly mounted on the outer end thereof, the element 24 forming a mounting for a clutch member 25 which is slidable axially of the element 24, but non-rotatable relative thereto, by the provision of mating plane surface portions preferably of hexagonal contour. The shaft 23 has a co-operating clutch member 26 threadedly disposed on a confronting end portion, the element 26 being provided with a portion 27 hexagonal in shape engageable with clutch member 25 upon movement of the member 25 axially, whereby the shafts 14 and 23 may be operatively linked.

Axial movement of the clutch member 25 may be effected by a swingable arm having a forked portion engaging the clutch member 25 and actuated by link means extending through the vehicle dash or instrument board and easily accessible by the vehicle operator.

To prevent an attempt to operably connect the shafts 14 and 23 when the engine is running at high speed, or other than when the engine is not running or at idling speed, we preferably provide centrifugally responsive means locking the member 25 in a non-operating position. The said link means and locking means are more fully described in our aforesaid co-pending application.

The operation of the compressor will now be described. The compressor chamber 22 is generally semi-circular in contour as best illustrated in Fig. 6, and encases a cylinder 30 having a piston 31 reciprocatingly disposed therein, movement being imparted to the piston 31 from the shaft 23 in any suitable manner, as by a plate 32 provided with a lateral eccentric lug 33, the lug 33 being projected through a perforation provided in the cylinder wall to operatively engage the central portion of the piston.

As best illustrated in Figs. 5 and 6, the cylinder walls are provided with transversely aligned elongated slots, indicated at 34. A pin 35 encircles the lug 33, and the transversely extending pin ends are projected through transversely aligned perforations provided in the walls of the piston 31. The perforations in the piston 31 provide a fixed clearance relative to the pin ends to permit transverse sliding movement and the slots provided in the cylinder walls are of sufficient longitudinal extent to accommodate the eccentric movement of the lug 33, whereby the eccentric movement of the lug 33 will impart reciprocating movement to the piston 31 within the cylinder.

Any suitable refrigerant medium may be employed, which in gaseous form will be drawn into the compression chamber through an inlet port 36 and thence will alternatively be drawn through relatively small inlet ports 37 and 38 into the cylinder 30, and as the ports 37 and 38 are successively covered a charge will be trapped intermediate the cylinder ends and the piston ends and compressed. The compressed charge will be alternatively forced through valves 39 and 40 operable to open at a predetermined pressure against compressed springs resisting valve-opening movement to permit passage of the compressed charge into a conduit 41 interconnecting the spring operable valves 39 and 40.

The charge or compressed refrigerant then passes outwardly from the housing 15 through a port 42, through a conduit line 43, preferably formed of relatively thick copper or the like material, to a condenser 44 disposed at the forward end of the vehicle, where due to the combined effect of the speed of the vehicle and the conventional fan indicated at 45, the charge is cooled and/or condensed.

The condenser 44 may comprise the conventional radiator of the vehicle with the conduits carrying the refrigerant medium adapted thereto in a suitable manner.

The refrigerant medium is carried from the condenser 44 to an expansion valve generally indicated at 46 by means of a conduit 47, expansion valves being well known in the refrigerator art, and controlling the pressure at which the compressed and/or condensed refrigerant is supplied to the evaporator.

As is well known in a closed system, as in the present system, and irrespective of the amount of liquid in the system, the expansion of gas is dependent upon a vapor pressure which can be controlled by the expansion valve 46. Fig. 3 best illustrates the expansion valve which we preferably employ and comprises a closed housing provided with an inlet port or conduit 47, generally indicated at 48, and an outlet port leading to the evaporator coils generally indicated at 49. The inlet port 48 is provided with a filter material, indicated at 50, insuring that the refrigerant medium will be received into the housing in the form of a spray or in comminuted form and thence is passed through a thermostatically controlled needle valve, generally indicated at 51. As previously stated, irrespective of the amount of liquid in a closed system, a definite temperature will exist in correspondence with a definite vapor pressure and by controlling the pressure in the system, the temperature may be controlled, or conversely, the temperature responsive means may control the vapor pressure.

The needle valve arrangement generally indicated at 51 comprises a relatively minute port 52 controlled by a needle valve 53, the needle valve being provided with an enlarged externally threaded stem whereby it may be adjustably positioned in a yoke element 55.

The yoke element 55 at one end is adjustably secured to a Sylphon type thermostatic bellows, the bellows comprising a base 56 to which the yoke element 55 is adjustably secured, and a head 57 secured to the outer portion of the housing, the base and head being sealingly joined by corrugated expansible material whereby upon the bellows being filled with thermal responsive expansible material the yoke 55 and needle valve element 53 may be moved axially of the housing.

A spring 58 is disposed within the bellows and aids in the expanding movement of the bellows, forcing the yoke and its associated needle valve element 53 in a direction to uncover the port 52 and permit passage of the refrigerant into the evaporator. It will be noted that the evaporator coils (to be later described) are always in communication with the interior of the housing and that the temperature of the refrigerant medium in the evaporator coils will be substantially the same as the temperature of the refrigerant surrounding the thermo-responsive bellows, whereupon if the temperatures of the refrigerant and the evaporator become too high the thermostatic bellows, aided by the spring 58, will cause the valve element 53 to uncover the port 52 and permit the refrigerant medium to flow into the evaporator coils, lowering the temperature. Upon the temperature of the evaporator tending to become too low the thermostatic bellows will contract, closing the port 52 and shutting off the supply of refrigerant to the evaporator.

It will be observed that the expansion valve housing is maintained sealed from the atmosphere whereby the operation of the expansion valve will be unaffected by changes in atmospheric pressure at varying altitudes. Thus, the temperature of the evaporator may be controlled within narrow limits and this temperature may be altered by axial movement of the needle valve element 53 within the yoke 55 supporting the same.

We contemplate that various types of expansion valves other than that shown may be employed such as a capillary tube, or a combination of other types with that described may be employed.

The refrigerator cabinet is generally indicated at 60 and preferably disposed forwardly of the vehicle dash and suitably insulated. The construction and relative positioning of the refrigerator cabinet is more fully described in our copending application Serial No. 29,332, and reference may be had thereto for additional details. Within the cabinet 60 is disposed a unit 61 commonly termed an evaporator, comprising a continuous coil having one end sealingly secured to the port 49 of the expansion valve and bent so as to have substantially parallel portions closely adjacent, both horizontally and vertically, to provide a maximum coil heat absorption surface for the space utilized by the evaporator unit.

As previously explained, the inlet end of the evaporator conduit is connected with the expansion valve, and the opposite or outlet end is connected with an evaporator control valve generally indicated at 63 which valve controls the passage of the refrigerant expanded by the absorption of the heat from the cabinet 60 back to the compressor. The control valve 63 comprises a generally closed housing provided with an inlet port 64 and an outlet port 65, the outlet port 65 being connected by a conduit 66 to the inlet connection 36 at the compressor.

The passage of the refrigerant from the inlet port 64 to the outlet port 65 is throttlingly thermostatically controlled in a manner now to be described.

An inter-connecting conduit generally indicated at 67 is intersected by a transversely extending bore within which is disposed a throttling valve element 68 which may variably restrict flow of refrigerant through the conduit or passage 67.

Secured to the upper end of the valve element 68 is an annular plate 69 tending to be continuously forced in a position to maintain passage 67 closed by means of a compression spring 75.

The thermostatic bellows generally indicated at 71 comprises a base of annular form having a central portion of cup form, indicated at 72, a head portion 73 integrally secured to the housing and sealingly secured to one end of a tube 74, the base and head portions being joined by a corrugated expansible portion 70. The tube 74 leads to a thermostatic bulb 76 disposed within the refrigerator cabinet, the bulb 76, tube 74, and thermostatic bellows being filled with thermo-responsive expansible material whereby variations of temperature in the refrigerator cabinet communicated to the thermostatic bulb 76 will effect movement of the thermostatic bellows which will be communicated to the throttling valve element 68.

The thermostatic bulb 76 may be of any conventional design and constitutes no essential part of my invention, and it will be understood that upon the temperature of the cabinet 60 rising above a predetermined value that the expansible material will effect expansion of the thermostatic bellows, forcing the throttling valve element 68 against the tension of the spring 70 and permitting refrigerant fluid to pass from the evaporator to the compressor and be circulated through the system resulting in a lowering of temperature in the cabinet.

At a predetermined low temperature the expansible material in the thermostatic bulb will contract permitting the spring 70 to force the throttling valve element 68 in a closing direction as the pressure within the thermostatic bellows is reduced, and correspondingly cutting off the supply of refrigerant fluid to the compressor, resulting in raising the temperature in the refrigerator cabinet 60.

Thus, it will be understood that irrespective of variations in speed of the compressor, as will necessarily occur when directly linked to a variable speed engine, the temperature of the refrigerator cabinet 60 may be maintained within a predetermined limit by means of the expansion valve 46 and the control valve 63, together with a throttling control effected at the ports 37 and 38 leading to the compression cylinder of the compressor to be later described.

It will be noted by reference to Fig. 1 that the bulb 76 is clamped closely adjacent the conduit connecting the evaporator and the control valve 63 whereby any liquid refrigerant passing the bulb will effect a throttling of the valve and prevent passage of liquid refrigerant to the compressor. The control valve 63 thus performs the dual function of regulating temperature, and acting as a "frost-back" control.

A relatively small vent 67a from conduit 67 allows the pressure of refrigerant gas corresponding to that of the compressor to be communicated to the outside of the bellows. There are then three pressures effecting movement of the throttling valve element 68, first the downward pressure of the gas within the bellows varying with the temperature of the bulb 76, the upward pressure of the gas within the valve communicated through the vent 67a, and the upward pressure of the spring 70 which is constant.

The pressure acting externally of the bellows varies with the amount of throttling. When there is no throttling taking place, the external pressure on the bellows becomes approximately the same as the pressure in the evaporator coils and in the compressor chamber, any difference being due to the pressure drop from flow of gas in the line. However, when the valve is throttling, the external bellows pressure becomes the same as the compressor chamber pressure which will be less than the pressure in the evaporator coils.

The pressure within the thermostatic bellows will vary according to the temperature of the bulb 76 and when the refrigerator compartment is warm, the bulb will be correspondingly warm and sufficient pressure will be exerted internally of the bellows to offset the pressure of spring 70 and the external gas pressure on the bellows. If the pressure is not sufficient, a throttling action will exist and the external bellows pressure will be reduced and the valve element 68 will move downwardly to open the passageway so that no throttling will exist.

As the temperature of the bulb 76 is reduced, the internal bellows pressure is reduced causing the valve element 68 to rise to effect a partial throttling, causing the external bellows pressure to be reduced to again open the passageway. However, if the bulb continues to remain cold or is subjected to a rapidly reduced temperature due to contact with liquid refrigerant passing through the conduit 67, the internal bellows pressure will be reduced a considerable amount so that valve element 68 can no longer maintain a full-open position and will cause a restriction in the passageway and a resultant pressure reduction.

Relative to ports 37 and 38 it will be understood that at relatively slow engine speed and consequent slow reciprocating movement of the piston 31 that the interval between charges which are alternatively pushed from each end of the compression cylinder to the conduit 43 leading to the radiator, will be relatively great, and the ports 37 and 38 will be uncovered for a relatively great period. As the engine speed is increased, the time intervals between successive charges will be reduced but the time interval during which the ports 37 and 38 are uncovered will be correspondingly reduced so that the volume of refrigerant fluid forced through the system by the compressor will tend to be maintained constant.

Referring now to Fig. 7, I have shown a modification of my invention wherein a different means of throttling the supply of refrigerant fluid to the compression cylinder is employed for maintaining the output of the compressor substantially constant. In this modification, a shaft 80 generally similar to shaft 23 previously described, is provided, and the inlet port for refrigerant fluid, indicated at 81, permits the refrigerant fluid to flow to the shaft 80 by means of a conduit 82 extending transversely of the bearing, for shaft 80, indicated at 83. Shaft 80 is provided with a bore therethrough, indicated at 84, adapted at a relatively rotated position of the shaft to align with the conduit 82 permitting passage of the refrigerant fluid to an angularly disposed port 85 leading to the compression chamber surrounding the compressor cylinder 30.

At relatively low engine speed the bore 84 provided in the shaft 80 will engage the conduit 82 for a relatively longer interval and permit a relatively greater volume of the refrigerant fluid to pass into the compression chamber 22, but since the piston 31 will be reciprocating in cylinder 30 at a relatively slow speed in correspondence with the engine speed, the successive charges pushed into the conduit 43 will be fewer in a given interval than at higher engine speed. As the engine speed increases the number of charges in a given interval will be increased but the bore 84 will be in contact with the conduit 82 for a smaller time interval permitting a lesser volume of refrigerant fluid to reach the compressor cylinder 30 per revolution of the shaft 80. Thus, an automatic throttling of the supply of refrigerant fluid to the compressor is effected with increased engine and compressor speeds.

We contemplate that other means may be employed to automatically control flow of refrigerant to the compressor with increased speed such as a throttling valve having a governor controlling valve opening movement, one such means being illustrated in a patent to Drysdale U. S. 1,970,034. The control valve 63 alone can function to replace the compressor throttling means if a sufficiently large condenser is used.

The predetermined compressor speed at which the compressor should operate at maximum capacity is preferably based on a vehicle speed of 25 miles per hour.

Referring now to Fig. 8, we have shown a modification of our invention wherein the compressor is directly connected by a suction conduit 95 to the evaporator and a control valve 100 generally similar to control valve 63 is adapted to control the by-passing of refrigerant around the compressor. The valve 100 is connected to the suction side of the compressor or conduit 95 by a conduit 96 and to the discharge side by a conduit engaging the conduit 43, bulb 76, and tube 74, connecting the same with the expansible bellows 101 of valve 100 being associated with the evaporator and cabinet as previously described.

The valve 100 is generally similar to valve 63 previously described, except that the valve element 102 is adapted to close the passageway through the valve when the bellows is expanded rather than open the same and to open the passageway when the bellows contracts.

It will now be understood that as the evaporator temperature lowers, the bellows will contract permitting compressed refrigerant to pass through the valve from the discharge side of the compressor to the suction side and be re-compressed, reducing the amount of refrigerant fluid passing through the condenser to the evaporator. Upon a pre-determined increase in evaporator temperature the bellows will expand closing the passageway of valve 100 and all the compressed refrigerant fluid will pass to the condenser and evaporator.

The details of lubricating the compressor and other moving parts are more fully described in our co-pending application, Serial No. 29,334, and reference may be had thereto for a fuller description of these details. In the form shown, spiral grooves are provided in the shafts 14, 23, and/or 80 to carry lubricant from a source of lubricant supply adjacent the worm 13, and pin 35 may be bored as indicated at 86 to receive lubricant by gravity and transmit the same to the surface of the lug 33, and excess lubricant may flow from the lug 33 through a similar bore provided in the opposite pin end and indicated at 87. The chamber 19 enclosing the clutch mechanism will be supplied with lubricant by the shaft 14 and the grooves therein, and to prevent escape of lubricant other than to the shaft 23 or 80 any suitable sealing means may be employed.

We have illustrated sealing means comprising an annular ring 90 sealed at one end to the chamber 19 and a second annular ring 91 sealed by means of an element 92 having an annular frusto-conically shaped bearing surface engaging the clutch member 26, the annular elements 90 and 91 being sealingly interconnected by a corrugated axially expansible portion 93, and a spring 94 encircling the portion 93 and compressively engaging the elements 90 and 91 insures that the bearing element 92 will always maintain an efficient seal with element 26.

Although we have shown and described a modification of our invention, we contemplate that numerous and extensive departures may be made therefrom without departing from the spirit of our invention or the scope of the appended claims.

Having thus described our invention, what we claim is:

1. In a refrigerating system, the combination of a variable speed compressor, an evaporator, conduit means forming a closed system with the compressor and evaporator for refrigerant fluid traversing the system, the compressor having valve means adapted to admit quantities of refrigerant fluid varying inversely per compressor crank revolution, and means controlling flow of refrigerant fluid from the evaporator to said last named means responsive to variation in the evaporator temperature.

2. In a refrigerating system, the combination of a variable speed compressor, an evaporator, conduit means forming a closed system with the compressor and evaporator for refrigerant fluid traversing the system, means controlling the flow of refrigerant fluid from the evaporator to the compressor responsive to the evaporator temperature, the compressor having valve means associated therewith admitting refrigerant to the compressor, a throttling control of refrigerant fluid whereby the quantities of said fluid admitted to the compressor are controlled to vary inversely per compressor crank revolution.

3. In a refrigerant system adapted to automotive vehicles, the combination with a variable speed engine furnishing motive power for the vehicle, of a variable speed compressor adapted to be operatively connected to the engine, an evaporator disposed in a cabinet having heat insulated walls, a condenser, conduit means forming a closed system with the compressor, the condenser, and the evaporator for refrigerant fluid traversing the system, means regulating flow of refrigerant fluid to the evaporator from the condenser responsive to variations in the evaporator temperature, the condenser being disposed forwardly of the vehicle radiator in the path of cooling air, and means by-passing flow of refrigerant fluid to the evaporator responsive to the evaporator temperature by directing refrigerant fluid flow from the high pressure side of the compressor direct to the low pressure side, the compressor having valve means associated therewith admitting refrigerant to the compressor in quantities varying inversely per compressor crank revolution.

4. The combination as described in claim 3 and wherein the vehicle fan is utilized in cooling the refrigerant fluid passing through the condenser.

5. In a refrigerant system adapted to automotive vehicles, the combination with a variable speed engine of a variable speed compressor adapted to be operatively connected to the engine, an evaporator, a condenser, conduit means forming a closed system with the compressor, the condenser and the evaporator for refrigerant fluid traversing the system, means regulating flow of refrigerant fluid to the evaporator from the condenser responsive to variations in the evaporator temperature, the condenser being disposed in the path of cooling air, means by-passing flow of refrigerant fluid to the evaporator responsive to the evaporator temperature by directing refrigerant fluid flow from the high pressure side of the compressor directly to the low pressure side thereof, the compressor having valve means associated therewith for decreasing the relative quantities of refrigerant fluid admitted to the compressor as the engine speed is relatively increased.

6. In a refrigerating system, the combination of a variable speed compressor comprising a piston and an admission valve, the admission valve being closable by the piston during a major portion of the piston stroke, an evaporator, conduit means forming a closed system with the compressor and evaporator for refrigerant fluid traversing the system, means regulating flow of refrigerant fluid from the evaporator responsive to evaporator temperature, and the admission valve being open for shorter intervals as the compressor speed is increased to correspondingly admit lesser quantities per compressor crank revolution of refrigerant fluid to the compressor.

7. The refrigerating system, as described in claim 6 and wherein a spring loaded discharge valve is associated with the compressor operable to discharge compressed refrigerant at a predetermined pressure.

OSCAR U. ZERK.
DANIEL ROLAND VANNEMAN.